Figure 1:
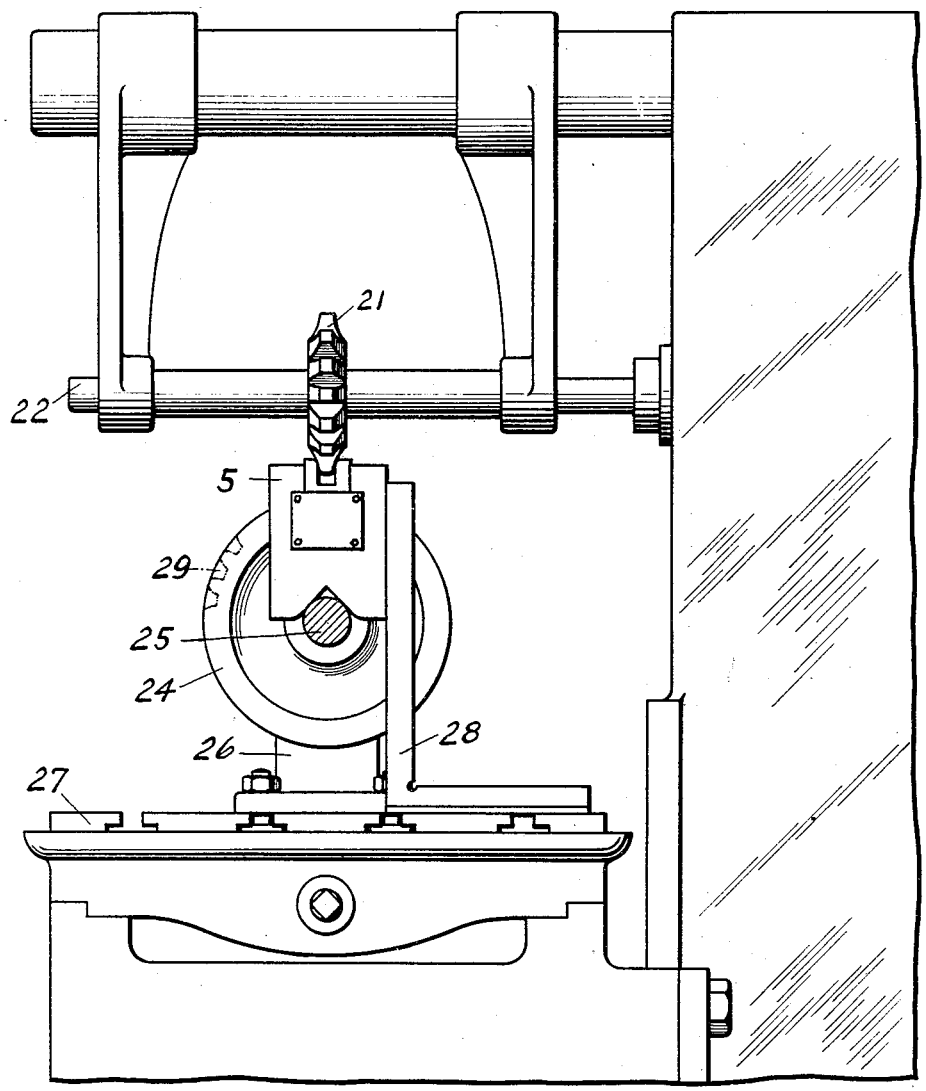

Feb. 24, 1931.  E. G. FLAMM  1,794,162
GEAR CUTTER CENTERING GAUGE
Filed June 14, 1928   2 Sheets-Sheet 1

WITNESSES:

INVENTOR:
Edward G. Flamm,
BY
ATTORNEY.

Feb. 24, 1931.  E. G. FLAMM  1,794,162
GEAR CUTTER CENTERING GAUGE
Filed June 14, 1928  2 Sheets-Sheet 2
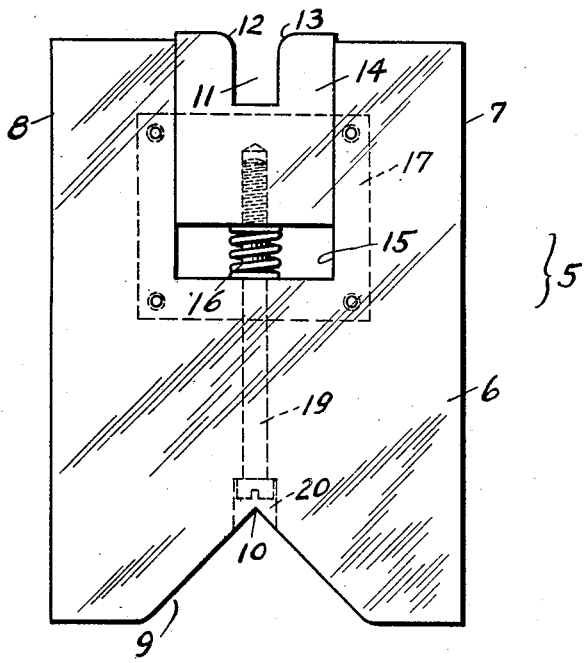
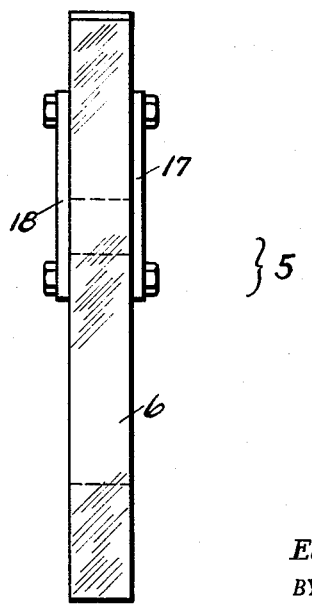
INVENTOR:
Edward G. Flamm,
BY
Joshua R H Potts
ATTORNEY.

Patented Feb. 24, 1931

1,794,162

UNITED STATES PATENT OFFICE

EDWARD G. FLAMM, OF PHILADELPHIA, PENNSYLVANIA

GEAR-CUTTER CENTERING GAUGE

Application filed June 14, 1928. Serial No. 285,255.

My invention relates to tools and more particularly to centering gauges for milling machines.

In cutting gears, the milling cutter is secured on the shaft of the machine and a gear blank secured on an arbor disposed at right angles to the shaft and carried by a dividing head clamped to the table of the machine. The cutter should be so located upon the shaft that its central plane will be at an exact right angle to that of the gear blank and in line with a radius of the gear blank in order that the teeth of the gear cut therefrom may extend radially. Sometimes the position of the gear blank relatively to the cutter is adjusted by the eye alone, and sometimes a plumb rule is used, but the expedients now in use either produce merely approximate results or require expenditure of considerable time.

The object of this invention is to provide a centering gauge by which the proper alignment of the gear cutter and gear blank may be obtained.

With this and other objects in view, the invention resides in the features of construction and arrangement of parts herein described and claimed and illustrated in the accompanying drawings in which Figure 1 is a side view of a part of the milling machine, showing an embodiment of my invention.

Figure 2 a side view of the gauge shown in Figure 1, one cover plate being omitted, and Figure 3 an edge view of the gauge.

Referring first to Figures 2 and 3, the gauge, designated in its entirety by the numeral 5, has a body part 6 whose sides 7 and 8 are straight and parallel. A triangular depression 9, having sides of equal length, is formed in the bottom of the body part.

A depression 11 is formed in the top of the gauge with its centerline in alignment with point 10 of depression 9 and equidistant from one or both sides of the gauge. The edge walls of depression 11 are rounded off at their outer ends to form arcuate corners 12 and 13 adapted to abut the sides of a milling cutter tooth so that, when the gauge is resting upon an arbor with side 7 perpendicular and a tooth of a milling cutter abutting corners 12 and 13, the milling cutter will be in radial alignment with the arbor.

In order to prevent corners 12 and 13 from becoming battered by being thrust violently against the sides of a milling cutter and to prevent the necessity of accurately spacing the arbor from the cutter, depression 11 is preferably formed in a slide 14 which is mounted in a guideway 15 formed in the upper part of body part 6. A spring 16 is disposed between slide 14 and the bottom of guideway 15 and the slide held against transverse movement in the guideway by cover plates 17 and 18, as shown in Figure 3.

In order to prevent slide 14 from falling out of guideway 15 when the gauge is inverted, a bolt 19 is rotatably mounted in the center of body part 6, extended through spring 16 and threaded into slide 14; a counterbore 20 being provided for the head of the bolt. Slide 14 may normally project slightly beyond the upper edge of body part 6 and, when thrust against a milling cutter, may depress spring 16 until its upper edge is below the top of the body part.

Referring now to Figure 1, a milling cutter 21 is shown mounted upon the shaft 22 of a milling machine and a gear blank 24 shown mounted upon the arbor 25 of a dividing head 26 secured to the table 27 of the milling machine. By placing gauge 5 on arbor 25, positioning it perpendicularly to table 27 by means of an ordinary machinist's square 28, and moving cutter 21 along shaft 22, corners 12 and 13 abutting each side of one of its teeth, the milling cutter is located radially of gear blank 24 so that teeth may be properly located in the rim of the gear blank, as shown in dotted lines at 29.

While I have illustrated and described one embodiment of my invention, it will be understood that modifications may be made without departing from the spirit of the invention and, hence, I do not wish to limit myself to the precise construction set forth but consider that I am at liberty to make such changes and alterations as fairly come within the scope of the appended claims.

I claim:

1. A centering gauge comprising a body having a straight side and a fixed arbor centering depression in one end and a movable member having a cutter centering depression opposite the first mentioned depression with the center lines of the depressions coinciding and parallel to said straight side of the body.

2. A centering gauge including a body part having a straight side and a triangular depression in one end and a guideway in the opposite end; a slide mounted in the guideway and having a cutter centering depression in its end opposite the first mentioned depression with its center line extended bisecting the apex of the first mentioned depression, a spring between the end of the guideway and the slide, and means for holding the slide against lateral movement with respect to said body part.

3. A centering gauge including a body part having a straight side and a fixed triangular depression in one end and a guideway in its opposite end parallel with the straight side, a slide mounted in the guideway and having a cutter centering depression in its outer end said depressions having a common bisector, a spring between the end of the guideway and the slide, plates covering a part of the guideway, and means for retaining the slide in the guideway.

4. A centering gauge including a body member having an isosceles triangular notch in one edge, a slide movable transversely of the body member and having a notch therein, said notches having a common bisector.

5. A centering gauge comprising a body having a fixed isosceles triangular notch in one end, a block mounted to slide at the end opposite the notch and having a centering depression, the center line of said block and depression coinciding with a bisector of the angle and means to adjustably limit the sliding movement of said block.

6. A centering gauge comprising a body having a fixed isosceles triangular notch in one end, a block mounted to slide at the end opposite the notch and having a centering depression, the center line of said block and depression coinciding with a bisector of the angle, means to adjustably limit the sliding movement of said block and means to maintain linear coincidence of said center line and said angle bisector.

In testimony whereof I have signed my name to the specification.

EDWARD G. FLAMM.